United States Patent [19]

Heath

[11] Patent Number: 5,702,077
[45] Date of Patent: Dec. 30, 1997

[54] THREADED BRACKET FOR HANGER ROD

[75] Inventor: Richard W. Heath, Yorba Linda, Calif.

[73] Assignee: Tolco, Incorporated, Corona, Calif.

[21] Appl. No.: 438,171

[22] Filed: May 9, 1995

[51] Int. Cl.⁶ ........................................... F16L 3/00
[52] U.S. Cl. ................................. 248/59; 248/62
[58] Field of Search ........................ 248/59, 58, 62, 248/323; 411/965, 368

[56] References Cited

U.S. PATENT DOCUMENTS

| | | | |
|---|---|---|---|
| 702,704 | 6/1902 | Caril | 248/59 |
| 948,902 | 2/1910 | Noyes | 248/62 |
| 1,758,040 | 5/1930 | Hess | 248/59 |
| 1,870,651 | 8/1932 | Robinson et al. | 248/59 |
| 1,898,898 | 2/1933 | Rowley | 248/62 |
| 2,111,357 | 3/1938 | Cornell, Jr. | 248/59 |
| 2,161,782 | 6/1939 | Flower | 248/59 |
| 2,868,485 | 1/1959 | Friel | 248/59 |
| 2,931,605 | 4/1960 | Kelly | 248/59 |
| 2,996,274 | 4/1961 | Marik et al. | 248/62 |
| 3,305,995 | 2/1967 | Armstrong et al. | 411/965 |
| 3,493,206 | 2/1970 | Albro | 248/62 |
| 3,868,806 | 3/1975 | Dey | 411/965 |
| 4,019,705 | 4/1977 | Habuda, Sr. et al. | 248/58 |
| 4,934,634 | 6/1990 | Breeden, Jr. et al. | 248/59 |
| 5,226,770 | 7/1993 | Watson | 248/58 |

*Primary Examiner*—Ramon O. Ramirez
*Assistant Examiner*—Anita M. King
*Attorney, Agent, or Firm*—Knobbe, Martens, Olson & Bear, LLP

[57] ABSTRACT

A mounting member for a ceiling or beam utilizes a barrel nut for connection with a hanger rod of a pipe hanging support. A technique of creating an offset portion about the barrel nut and then deforming that portion to provide secure fixation of the nut in the member to prevent rotation of the nut when the hanger rod is turned.

9 Claims, 5 Drawing Sheets

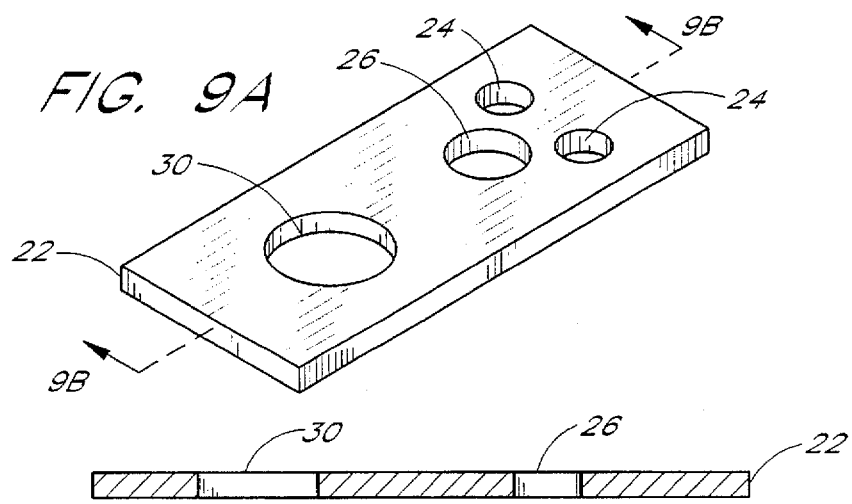
FIG. 9A
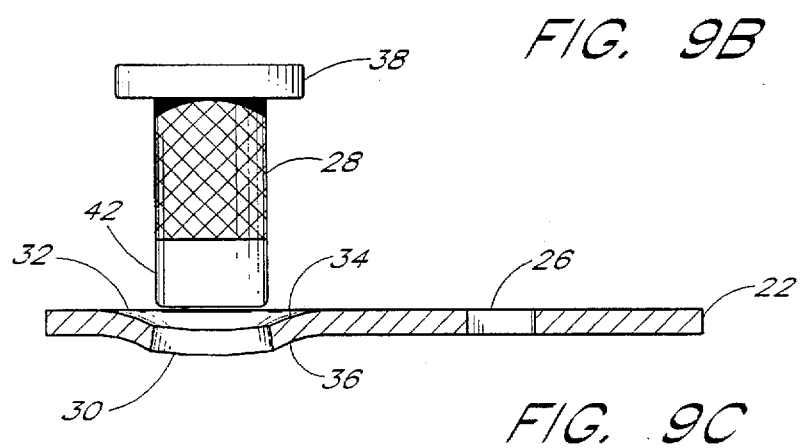
FIG. 9B
FIG. 9C
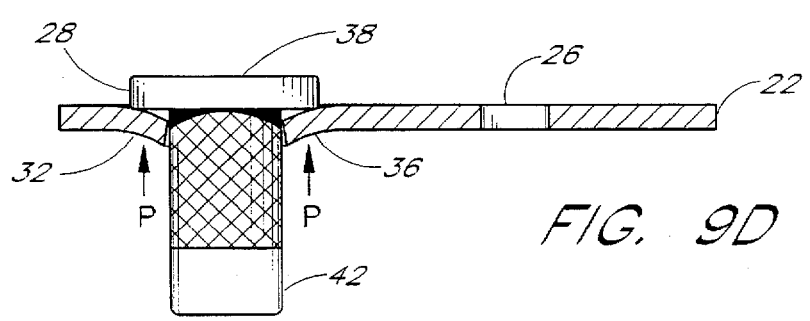
FIG. 9D
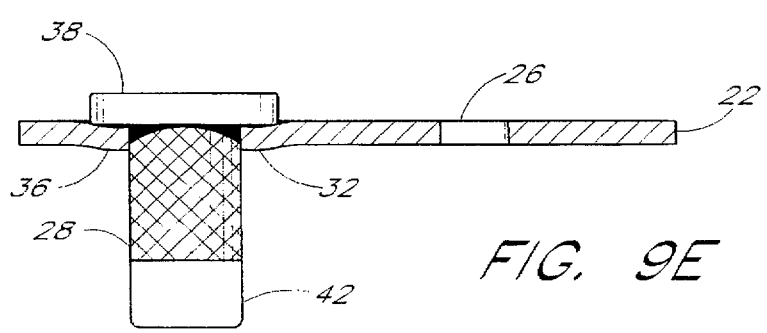
FIG. 9E

THREADED BRACKET FOR HANGER ROD

BACKGROUND OF THE INVENTION

The present invention relates to devices for hanging pipes below ceilings and beams, and, in particular, to a mounting plate or bracket incorporating threads for receiving a hanger rod used to suspend piping.

There is a multitude of pipe hanger products utilized by piping contractors in the commercial and industrial piping fields. Generally, these products allow various size pipes to be suspended from ceilings or beams within a facility, as the circuits formed by the piping are routed through a building. These products include clamps, hooks, straps, plates, and brackets, among other items. Hanger rods, for example, are used in suspending a pipe where the upper end of the rod is attached to a bracket mounted to a beam and the lower end of the rod is attached to a ring hanger supporting the pipe. The hanger rod is threaded, and a hole in the bracket is tapped to receive the rod. The initiation of the threaded connection between the rod and bracket hole is often awkward, however, due to the relatively precise alignment of the threads that is required.

Further, in the example above, the threaded connection of the hanger rod to the bracket is limited to the thickness of the bracket. Increased threaded contact is possible by either a larger diameter hole or a thicker bracket. An increase in hole diameter affects the load capability of the bracket, unless the bracket is made proportionately wider. However, for either a thicker or wider bracket, there is an increase in the bracket weight and therefore an increase in the load supported by the beam.

A typical technique for manufacturing plates and brackets for mounting to ceilings and beams includes a first production line for the fabrication of the plate or bracket with screw or bolt holes and then a second production line for tapping holes for the hanger rods. This separation of procedures increases both the time and cost of manufacturing the plates and brackets.

SUMMARY OF THE INVENTION

A mounting bracket constructed in accordance with the present invention for hanging a pipe support overcomes the aforenoted disadvantages by incorporating a ring nut or barrel nut which allows an increased threaded connection with a hanger rod and also makes the initiation of the connection with the rod easier.

A mounting member of the present invention comprises a plate or bracket mounting element having at least one mounting hole and another hole to receive a barrel nut. The barrel nut has a flange about one end and a threaded interior for receiving a hanger rod or the like. The nut is secured in the hole of the mounting element such that the flange contacts an upper surface of the element and its unflanged end extends below the element.

In the preferred embodiments of the present invention, the interior of the nut is threaded along a length greater than the thickness of the element, where the threaded length of the nut is less than its total length, such that the unflanged end of the nut has an interior surface that is unthreaded. The hole for the nut is formed in a portion of the element that is first coined, in that its upper surface is either raised or recessed from the surrounding upper surface of the element. The lower surface around the unflanged end of the nut is correspondingly recessed or raised, respectively, relative to the surrounding lower surface of the element.

After the insertion of the barrel nut into the hole, a die or tool is used to press the coined area back towards its original position relative to the upper/lower surfaces. When the top of the flange is desired to be substantially flush or even with the surrounding upper surface, such as for a ceiling plate mounting member, the coining is done to create a more recessed area on the top surface of the element. Thus, for the ceiling plate, the top of the flange does not extend past the plane of the upper surface and does not interfere in the mounting of the plate to the ceiling or beam.

A method of the present invention for manufacturing a mounting member constructed in accordance with the present invention comprises the steps of:

a) fabricating a strip of metal having a length equal to the length of an element of the mounting member;

b) forming a hole in the metal strip;

c) coining an area about the hole to produce an offset portion;

d) vertically positioning a barrel nut through the coined hole such that a flange on one end of the nut contacts the upper surface of the metal strip, and an unflanged end of the nut extends below the metal strip; and e) pressing the coined area around the nut so that the metal strip grips the periphery of the nut with sufficient force to prevent the nut from rotating when a hanger rod is threaded into the nut.

Although the convex or concave nature after the coining of the upper and lower surfaces in Step c) is not critical to the fixation of the product, since fixation for non-rotation of the nut is achieved by either coining method, it is preferred to coin a concave offset portion for mass manufacturing purposes.

For a side bracket embodiment of the mounting member, the method of the present invention preferably comprises coining the offset portion such that after insertion and fixation of the barrel nut, the raised/recessed coined areas are not substantially noticeable. Also, in this embodiment, the method of the present invention further comprises the step of bending the mounting member to form the bracket with two portions at substantially a 90-degree angle to one another.

For a ceiling plate embodiment of the mounting member, the method of the present invention preferably comprises deeper coining of the hole such that, after insertion and fixation of the nut, the top face of the flanged end is approximately even with the surrounding upper surface of the plate.

Progressive dies may be used for producing the holes, the offset portions, and the like for each member. The barrel nuts can be mechanically fed into the offset holes. Further, the method also preferably comprises the step of separating several mounting members from a single metal strip. Thus, the manufacture of a mounting member constructed in accordance with the present invention does not require a separate production line or equipment for tapping of the hole, and the cost is less to use inexpensive, readily available barrel nuts instead.

Further advantages and applications will become apparent to those skilled in the art from the following detailed description and the drawings referenced herein.

BRIEF DESCRIPTION OF THE DRAWINGS

FIG. 9A is a perspective view of a mounting element after its holes have been punched;

FIG. 9B is a cross-sectional view taken along lines 9B—9B of FIG. 9A;

FIGS. 9C–9E are cross-sectional views of the element with the nut shown in a side elevational view, showing coining of a concave upper surface of the element.

DETAILED DESCRIPTION OF THE PREFERRED EMBODIMENTS

Figure 1:
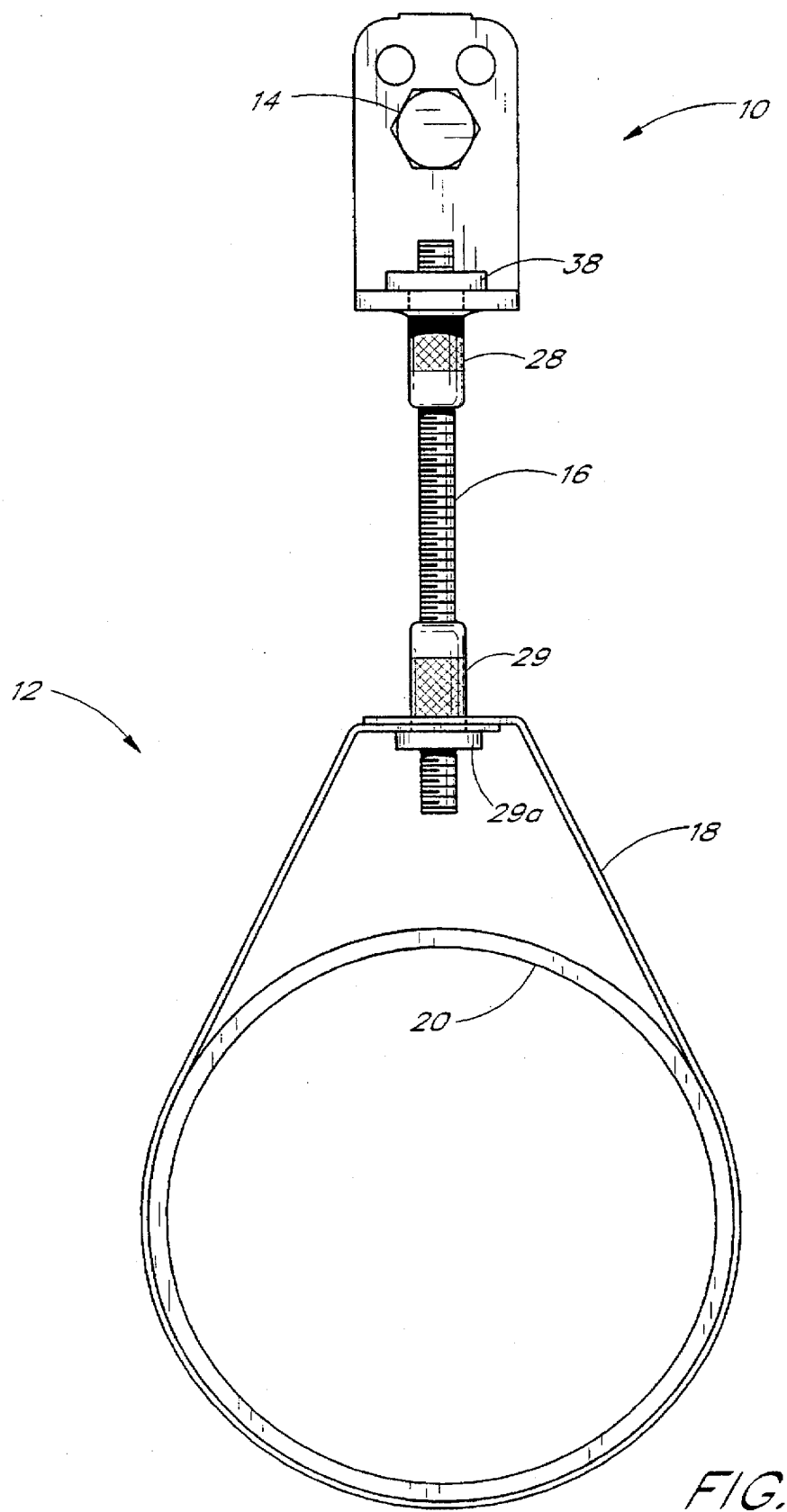
FIG. 1 is a perspective view of one embodiment of the present invention, wherein a bracket is coupled via a hanger rod to an adjustable hanger ring suspending a pipe.

FIG. 1 illustrates a first preferred embodiment of a mounting member in the form of a bracket 10 constructed in accordance with the present invention. As shown, the bracket 10 is used to mount a pipe hanging support 12 to the side of a wood, concrete, or steel beam (not shown).

Generally, this type of bracket 10 may be mounted to the beam with drive screws (not shown) or a lag bolt 14, depending upon the size of the piping to be suspended. Drive screws, for example, may be used with the bracket 10 for ½- to 2-inch pipes, while the lag bolt is used for up to 4-inch piping. In accordance with the invention, a threaded hanger rod 16 is coupled at its upper end to a ring or barrel nut 28 fixed in the bracket 10. A hanger strap 18 is attached to a lower end of the rod 16 by a barrel nut 29 to support a pipe 20. More specifically, the nut 29 extends through aligned holes in the strap ends so that flange 29a on the nut supports the strap ends. The rod is typically ⅜ inch in diameter to support ½- to 4-inch pipes.

Although the hanger strap 18 is shown in the form of a ring or tear drop-shaped loop, other types of hangers, such as a clevis hanger, J-hanger or others known to those skilled in the art, may be used with the hanger rod 16 to support the pipe 20. Alternately, eye rods, bolts, or the like may be used with the bracket 10 to suspend various types of pipe supports. And, as the piping size varies, so too do the appropriate sizes for the hanger and rod support elements.

Side Beam Bracket Embodiment

Figure 2:
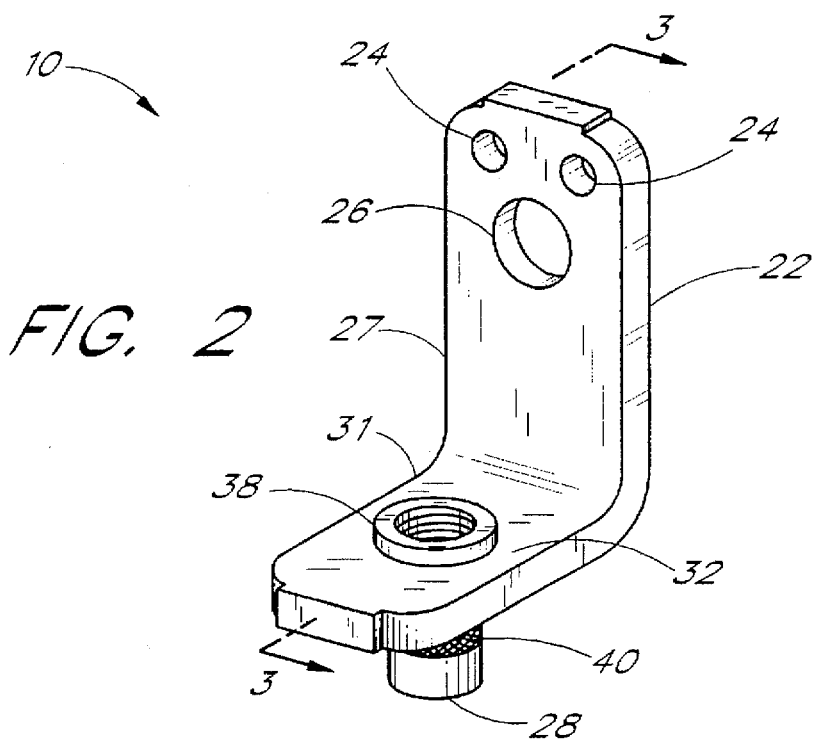
FIG. 2 is a perspective view of the bracket of FIG. 1.

Referring now in detail to FIG. 2, the bracket 10 preferably comprises an element 22 forming an L-shape, where lateral cross-sections taken along its length are rectangular. That is, the thickness, T, is much less than the width or length of the element 22, and its outer surfaces are substantially parallel. Preferably, the element 22 is fabricated from carbon steel to meet the standards set by the Underwriters Laboratories (U.L.), Factory Mutual Engineering (F.M.), and other such quality control groups. The element 22 may have a plain or electro-galvanized finish.

Figures 3, 4:
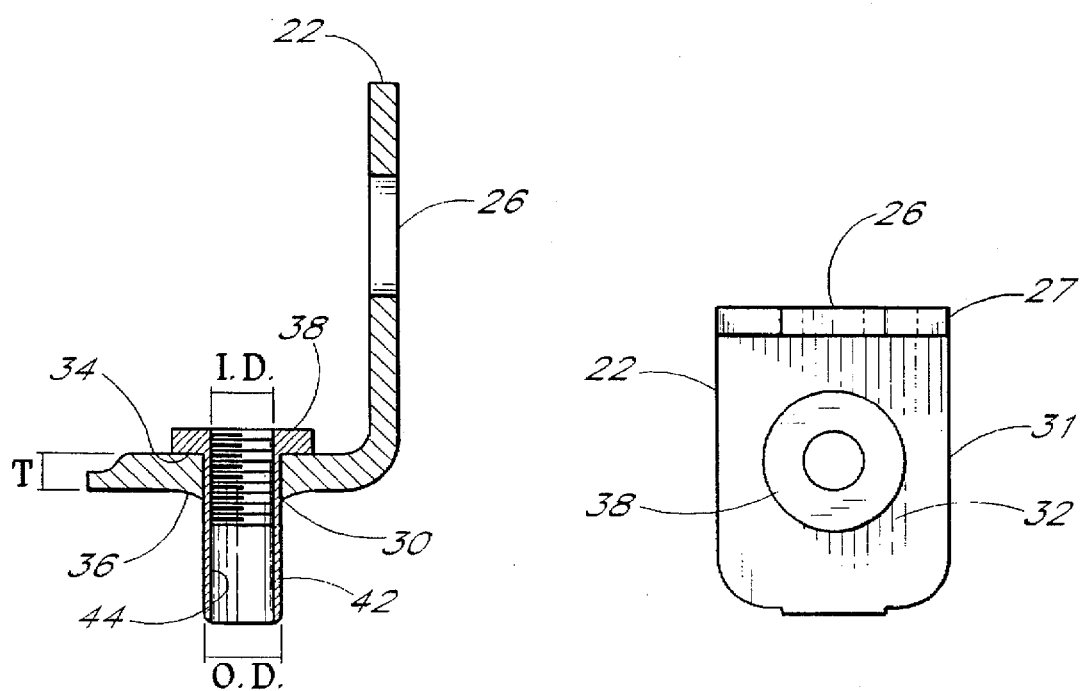
FIG. 3 is a cross-sectional view taken along lines 3—3 of FIG. 2.
FIG. 4 is a top view of the bracket of FIG. 2.

In the embodiment of FIGS. 2–4, three mounting holes 24, 26 are included in an upper, vertical portion 27 of the element 22 for side mounting to the beam. If drive screws are utilized, they are inserted through the two smaller, upper holes 24, and if a lag bolt is utilized, it is inserted through the larger, lower hole 26. Preferably, two #16×2" drive screws are used for supporting ½- to 2-inch piping in wood beams, where the corresponding mounting holes 24 are ¹⁷⁄₆₄ inch in diameter. The lag bolt is either ⅜ inch in diameter for up to 2-inch pipes or ½ inch for 2-½ to 4-inch pipes, with the mounting hole 26 preferably ³³⁄₆₄ inch in diameter to accept either the ⅜- or ½-inch bolt. In alternate embodiments, more or less mounting holes of similar or different sizes may be included on the element 22, and their arrangement thereon may be other than shown.

The mounting members constructed in accordance with the present invention further comprise a ring nut or barrel nut 28 which, for the bracket 10, is received in a hole 30 of a lower, horizontal portion 31 of the element 22. Preferably, the hole 30 is centrally positioned in a coined or offset portion 32 of the horizontal portion 31 of the element 22, where the offset portion 32 is initially coined such that an upper surface 34 of the element 22 is recessed or concave relative to the surrounding surface. The offset portion 32 has a lower surface 36 that is initially raised or convex relative to the surrounding surface of the horizontal portion 31. As will be discussed in greater detail below, the hole 30 in this offset portion 32 is preferably sized such that after the manufacture of the mounting member 10, a lower cylindrical portion of the nut 28 is circumferentially gripped by the element 22, and therefore not subject to rotation. That is, any normal torquing or twisting of the hanger rod when it is threaded into the nut 28 will not rotate the nut 28 in the bracket 10.

The barrel nut 28 has a flange 38 at one end which contacts the upper coined surface 34. For the ⅜-inch rod use, the OD of the flange 38 is approximately ¹¹⁄₁₆ inch. The nut 28 is preferably formed from carbon steel, although other similarly strong materials may be used as well. And, although it is not necessary to obtain the advantages of the present invention, knurling 40 or the like may be included around the exterior of the nut 28 to facilitate gripping of the nut 28 during insertion of the hanger rod.

As illustrated in FIG. 3, the threaded length of the nut interior is at least greater than the thickness T of the element 22, thereby affording better, stronger connection with the threads of the hanger rod than if the hole 30 were merely tapped. Preferably, the threaded length extends to nearly an unflanged end 42 of the nut 28, where the unflanged end 42 has an interior surface 44 that is left unthreaded to enable easier alignment of the hanger rod during its initial insertion.

Ceiling Plate Embodiment

Figure 5:
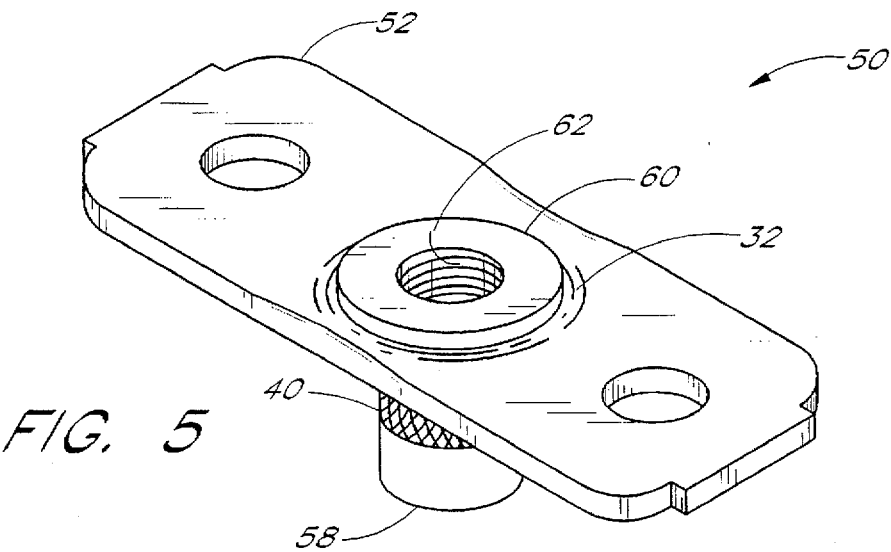
FIG. 5 is a perspective view of a bracket in the form of a plate constructed in accordance with the present invention.

Referring now to FIG. 5, a beam or ceiling bracket in the form of a plate 50 is shown in a second preferred embodiment of a mounting member constructed in accordance with the present invention. Generally, the ceiling plate 50 comprises a rectangular metallic element 52 and is utilized for mounting a pipe support to a ceiling or the bottom of a beam. Screws or bolts may be used for attachment to wood ceilings or beams, or the plate 50 may be welded to a steel beam. As described above, a hanger rod or other similar support element is coupled to the plate 50 to suspend the piping.

Figure 6:
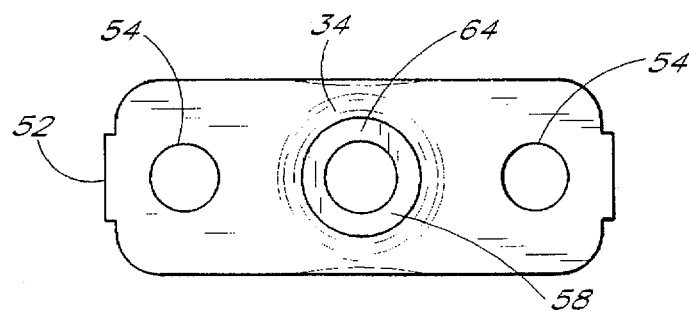
FIG. 6 is a top view of the plate shown in FIG. 5.
Figure 7:
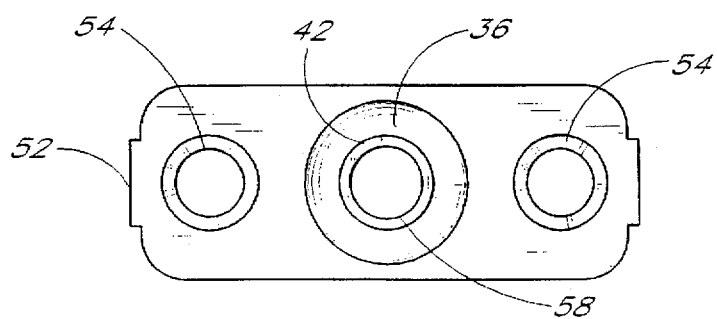
FIG. 7 is a bottom view of the plate shown in FIG. 5.

FIGS. 6 and 7 show top and bottom views of the plate element 52, which is preferably 3 inches long, 1-⅛ inch wide, and about ⅜ inch thick and is utilized for the hanging or suspension of ½ inch through 6-inch piping. Two mounting holes 54 are preferred to be positioned to either side of a central hole 56. The mounting holes 54 are preferably ⁵⁄₁₆ inch in diameter and are centered about ⁷⁄₁₆ inch from either end of the element 52. Preferably, the element 52 is fabricated from carbon steel and may have a plain, electro-galvanized, or stainless steel finish.

Figure 8:
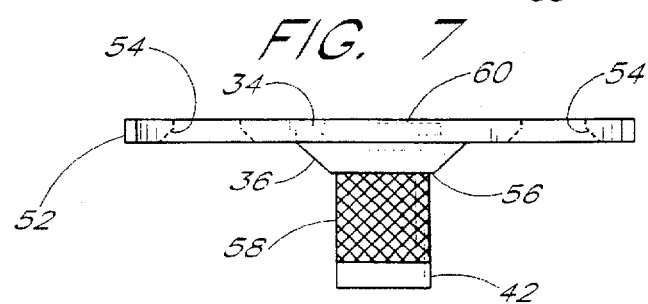
FIG. 8 is a side elevational view of the plate of FIG. 5.

The central hole 56 preferably receives a barrel nut 58, as seen more clearly in FIG. 8. For FIGS. 5–8, like numbers refer to like members. The barrel nut 58 for the ceiling plate 50 has an interior diameter corresponding to either a ⅜-inch or ½-inch diameter hanger rod, where the smaller rod size is used to support pipes up to approximately 4 inches in diameter, and the larger rod size is used to support pipes approximately 5 to 6 inches in diameter. The sizes of the hole 56 and nut 58 generally correspond to those described in connection with the bracket embodiment 10 of FIGS. 2–4 when used with the ⅜-inch hanger rod.

The nut 58 for the ceiling plate 50 has the same characteristics as previously described herein, including a flange 60 for communication with the upper coined surface 34 of the plate element 52, and a cylindrical barrel portion with a threaded interior 62 providing increased connection with the threads of the rod, yet ease in the initial insertion of the rod through the nut 58. Since the plate 50 is to be mounted such that its entire upper surface is against the ceiling or beam, it is preferred to secure the nut 50 through the hole 56 such that a face 64 of the flanged end of the nut 58 is approximately even with the plate's upper surface. This facilitates and improves the mounting of the plate 50 to the ceiling or beam. Again, the tight engagement of the nut 58 to the plate 50 resists any rotation of the nut 58 caused by a rotation of a coupled hanger rod or such.

For the preferred embodiments described herein, the installation of the pipe hanging system can include either the mounting of the bracket 10 or plate 50 prior to attachment of the hanger rod and pipe support, or the rod and support may be attached to the mounting member 10/50 prior to its attachment to a ceiling or beam.

Method of Manufacture

A preferred method of manufacturing several mounting members 10/50 constructed in accordance with the present invention comprises the steps of:

a) fabricating a strip of metal having a length equal to several mounting elements 22/52;

b) producing sequences of two or more holes 24,26,30/54,56 in the metal strip, where the sequence is repeated for each of the elements 22/52 to be manufactured from the strip;

c) coining the area about one of the holes 30/56 in the sequence to produce the offset portion 32;

d) vertically positioning the barrel nut 28/58 such that the flange 38/60 on one end of the nut 28/58 contacts the upper surface 34 of the metal strip, and the unflanged end 42 of the nut 28/58 extends below the metal strip;

e) pressing the flanged end of the nut and the coined area 32 around the nut 28/58 so that the metal strip deforms against the periphery of the nut 28/58 and securely grips the nut 28/58 without deformation of the nut 28/58; and f) separating the individual elements 22/52 from the strip.

For the side bracket 10, the method of the present invention preferably comprises the step of coining the offset portion 32 such that after Step e), the convex/concave coined areas 32 are not obvious. For the manufacture of ceiling and beam plates 50, however, it is preferred to coin a deeper offset portion 32 than is done for the side bracket 10 to allow the top face 64 of the flanged end of the nut 58 to be pressed to be nearly even with the surrounding surface of the plate 50, as seen more clearly in FIG. 8. Since the plate 50 is to be mounted with its entire upper surface positioned against the ceiling or beam, this method is preferred in order to produce the plate 50 with the nut 58 closely aligned and not creating an uneven surface that interferes with its mounting.

FIGS. 9A–E illustrate the manufacture of the bracket 10 from Steps c)–e) described above, where FIGS. 9A and 9B show the element 22 prior to coining. As will also be described, FIGS. 9A–E show generally the manufacturing method applied to the plate 50 from Steps c)–e) above. FIG. 9C shows the coined hole 30, where the coining has produced the concave upper surface 34 and convex lower surface 36. The coined hole diameter is slightly larger than the OD of the nut 28. FIG. 9D shows the element 22 after insertion of the nut 28 and prior to application of pressure P by a tool on the offset portion 32, against the nut 28 and flange 38. For the manufacture of the ceiling plate 50, the upper coined surface 34 shown in FIGS. 9C and 9D is much more recessed relative to the remaining upper surface. FIG. 9E shows the bracket 10 after the nut 28 has been secured and before bending to an L-shape. For the ceiling plate 50, the secured nut 58 is as shown in FIG. 8.

Figure 10A:
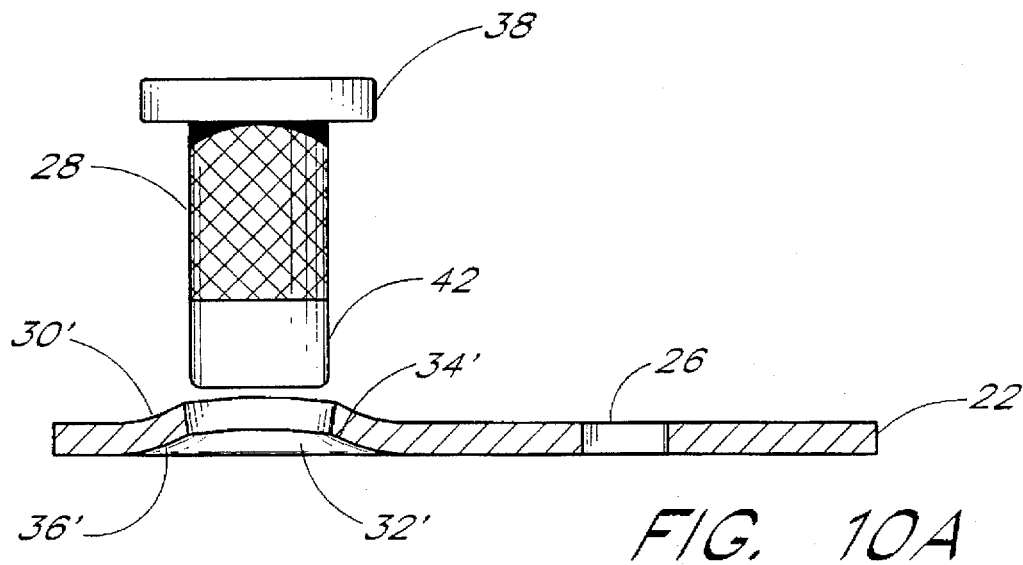
FIGS. 10A–10C are cross-sectional views of the element similar to FIGS. 9C–9E and show coining of a convex upper surface of the element.
Figure 10B:
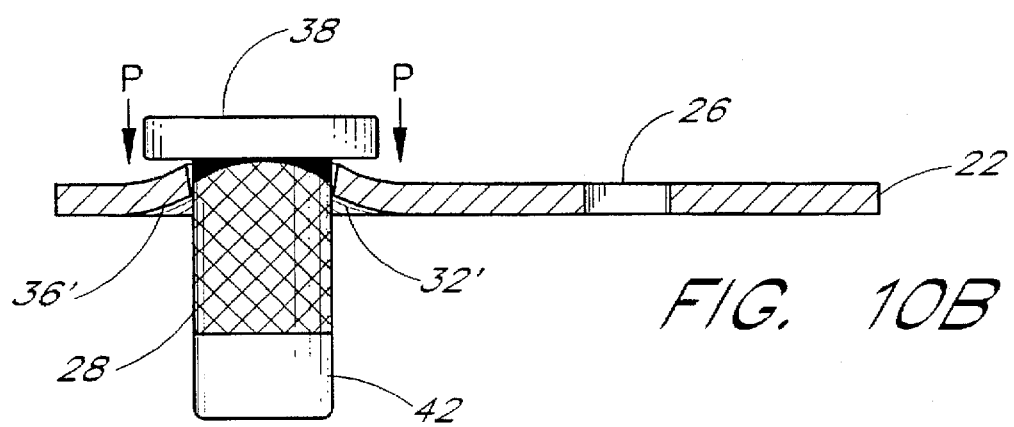
Figure 10C:
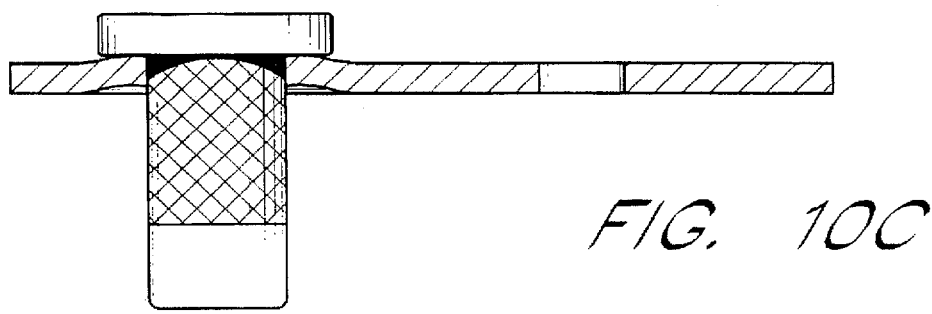

Referring to FIGS. 10A–C, an alternate method of affixing the nut 28 is shown, and is similar to the method shown in FIGS. 9C–9E. In this case, the upper coined surface 34 is convex relative to the remaining upper surface and the lower coined surface 36 is concave relative to the remaining lower surface of the element 22. This method is preferred for mounting members not requiring the face of the flange to be even with the upper surface. Although, the method shown in FIGS. 9A–E is preferred for mass manufacturing of the mounting members, since insertion of the nuts is easier into the funnel-like upper surfaces of the coined holes.

The technique for securely fixing the nut 28/58 in the mounting element 22/52 includes producing the coined hole 30/56 to have a diameter close to the outer diameter of the nut 28/58. The hole 30/56 for the ⅜-inch rod is originally dimensioned to be about 0.505 inch, with a tolerance of +0.002 inch, for a range of 0.505–0.507 inch. Thus, after coining of the offset portion 32, the diameter of the coined hole 30/56 is somewhat greater than the outer diameter of the nut 28/58, which facilitates the insertion of the nut 28/58. And, therefore, after pressure is applied to the reverse of the element 22/52, and the offset portion 32 is returned to nearly its original position with respect to the upper and lower surfaces, the element 22/52 is in compressive relation with the nut 28/58.

For the method just described, progressive dies may be utilized for producing the hole sequences and the coining, etc. Although coining is preferred, sizing, beading, or other manufacturing techniques known to those skilled in the art may be used to form the offset portions 32. Further, for the manufacture of the L-shaped, side brackets 10, the method includes the step of bending each element 22, separated from the strip, to form the two bracket portions 27, 31 which are at substantially 90 degrees to each other, where the bending is performed at any time after Step b). The separation of the individual elements 22/52 (Step f), may be performed any time after Step b); although, the method described herein may be similarly utilized to produce a single member 10/50.

In the method corresponding to the present invention, a separate production line and machinery for the tapping of the mounting members is eliminated and therefore streamlines production. And, since the cost of purchasing the readily available barrel nuts from an outside source, and the manner of incorporating them into the mounting members of the present invention, are much less than the savings from the streamlined production, an overall cost savings is realized.

Thus, the incorporation of the inexpensive barrel nut in a manner described herein, instead of tapping the mounting member, affords advantages that include 1) improved connection with the hanger rod, 2) easier insertion of the hanger rod through the mounting member, and 3) a cost savings from a streamlined production resulting from the elimination of the need for tapping of the member. Rotation of the nut in response to any twisting of the hanger rod is prevented by the manufacturing method of coining and then deforming the offset portion against the nut to secure it in the mounting bracket or plate.

The embodiments illustrated and described above are provided merely to illustrate possible incarnations of the present invention. Other changes and modifications can be made from the embodiments presented herein by those skilled in the art without departure from the spirit and scope of the invention, as defined by the appended claims.

What is claimed is:

1. A pipe support assembly for suspending a pipe, comprising:

a pipe hanger rod;

means for receiving and supporting the pipe when attached to a lower end of said rod;

a bracket for attachment to a raised support; and a barrel nut having a cylindrical portion extending through a hole in the bracket, with a flange on one end of the nut engaging an area of the bracket surrounding the hole, said nut having internal threads threadably receiving an upper threaded end of said rod, the material of said bracket forming said hole being deformed against the cylindrical portion of the nut to grip the nut and prevent movement of the nut relative to the bracket when the rod is inserted into an opposite end of the nut and rotated into threaded engagement with the internal threads.

2. A pipe support assembly for suspending a pipe, comprising:

a bracket; and a barrel nut having a threaded interior to threadably receive a support rod, said nut having a cylindrical portion secured in a hole in said bracket by a portion of said bracket deformed against the nut to resist rotation of said nut when said rod is to be threaded into the nut, and said nut having a flange on one end contacting an upper surface of said bracket, and an unflanged end extending below said bracket.

3. The assembly of claim 2, wherein a threaded length of said nut interior is greater than the thickness of said bracket, and said threaded length less than the total length of said nut.

4. The assembly of claim 3, wherein said unflanged end of said nut has an interior surface that is unthreaded.

5. The assembly of claim 2, wherein an area around said hole is coined prior to insertion of said nut, such that after fixation of said nut the coined area of said bracket contacting said flange is substantially even with a surrounding upper surface of said bracket.

6. The assembly of claim 2, wherein an area around said hole is coined prior to insertion of said nut, such that an end face of said flange is positioned to be approximately level with a surrounding upper surface of said bracket.

7. The assembly of claim 2, wherein said bracket and said nut are fabricated from carbon steel.

8. A method of supporting the upper end of a threaded support rod, comprising the steps of:

forming a hole in a horizontal portion of a bracket;

inserting a cylindrical portion of a barrel nut into the bracket hole with an annular flange on one end of the barrel nut engaging a portion of the bracket surrounding the hole;

forming said portion of the bracket surrounding the hole in a manner to prevent rotation of the barrel nut within the bracket hole;

mounting the bracket to an elevated support, with the horizontal portion of the bracket extending horizontally and with the flange on the barrel nut positioned substantially above the bracket horizontal portion and with the cylindrical portion of the barrel nut extending substantially below the horizontal portion of the bracket; and inserting a threaded end of the support rod into a lower end of the barrel nut and rotating the rod into internal threads within the barrel nut.

9. The method of claim 8, further including the step of preventing rotation which is performed by forming bracket material around the barrel nut so as to cause the bracket to grip the exterior of the nut.

* * * * *